United States Patent
Rock et al.

(10) Patent No.: US 7,592,088 B2
(45) Date of Patent: Sep. 22, 2009

(54) SEAL CONFIGURATION FOR FUEL CELL STACK

(75) Inventors: Jeffrey A Rock, Fairport, NY (US);
Matthew J Beutel, Webster, NY (US);
Scott C Ofslager, Albion, NY (US)

(73) Assignee: GM Global Technology Operations, Inc.

( * ) Notice: Subject to any disclaimer, the term of this patent is extended or adjusted under 35 U.S.C. 154(b) by 885 days.

(21) Appl. No.: 10/925,849

(22) Filed: Aug. 25, 2004

(65) Prior Publication Data
US 2006/0046128 A1   Mar. 2, 2006

(51) Int. Cl.
*H01M 2/08* (2006.01)
*H01M 2/00* (2006.01)

(52) U.S. Cl. .............. 429/35; 429/32; 429/34; 429/185; 429/210

(58) Field of Classification Search .......... 429/34, 429/35, 36, 38, 185, 210; 215/260
See application file for complete search history.

(56) References Cited

U.S. PATENT DOCUMENTS 6,815,115 B2 * 11/2004 Sugita et al. .............. 429/35
2003/0118889 A1 * 6/2003 Smith ........................ 429/36
2004/0091767 A1 * 5/2004 Zuber et al. ................ 429/40
2004/0137303 A1 * 7/2004 Kuroki et al. .............. 429/35

* cited by examiner

*Primary Examiner*—Dah-Wei D Yuan
*Assistant Examiner*—Kwang Han
(74) *Attorney, Agent, or Firm*—Harness, Dickey & Pierce, P.L.C.

(57) ABSTRACT

A seal configuration is provided for a fuel cell stack, including a first bipolar plate and a second bipolar plate, each disposed on opposite sides of a membrane electrode assembly. The seal configuration includes a first sub-gasket adhered to a recess region of the first bipolar plate and a second sub-gasket adhered to a recess region of the second bipolar plate wherein the first and second sub-gaskets are disposed on opposite sides of the membrane electrode assembly. A seal member is disposed in the recessed regions of the first and second bipolar plates and between the first and second sub-gaskets. The seal configuration minimizes the size of the bypass regions around the seal perimeter and provide better control of the positions of all components during assembly of the fuel cell stack. The approach also reduces sensitivity to ambient relative humidity variations and reduces manufacturing costs by eliminating the need for humidity control in the production area.

12 Claims, 4 Drawing Sheets

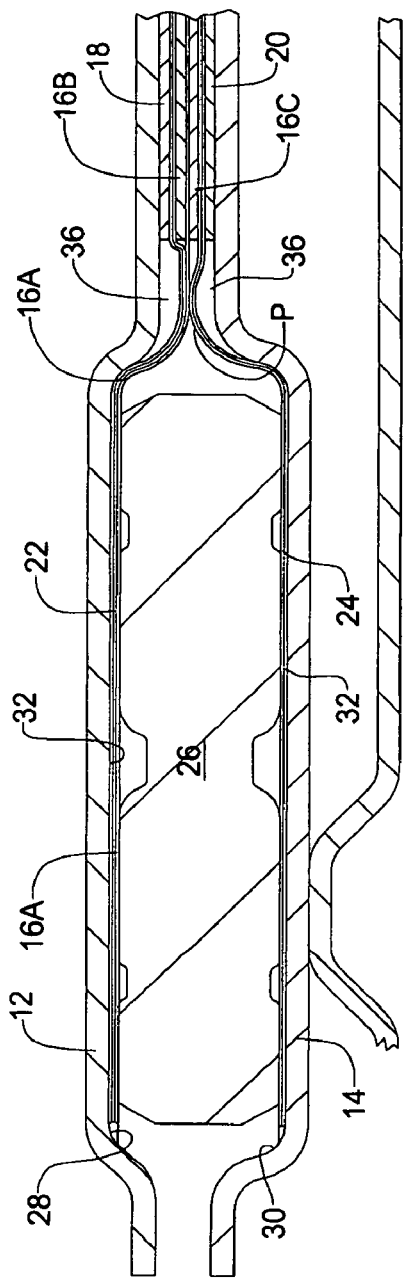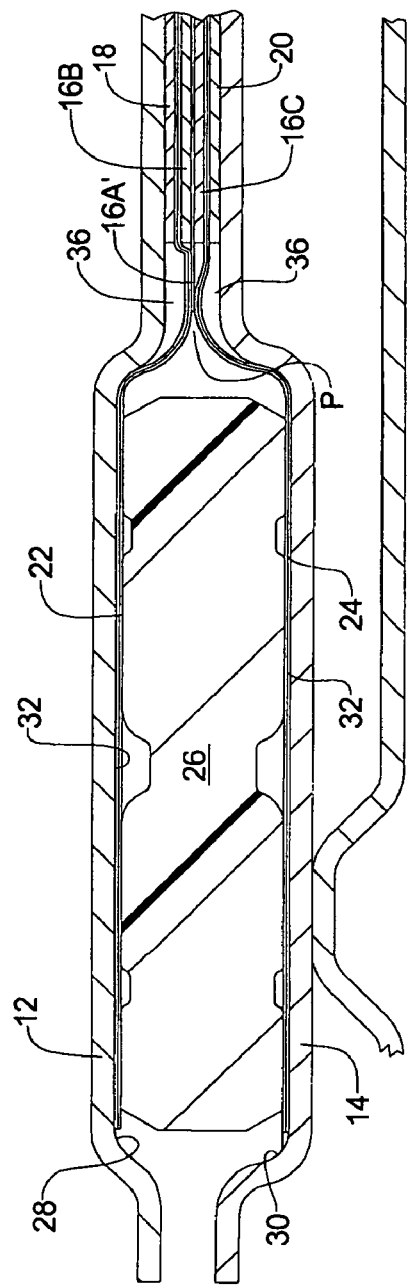

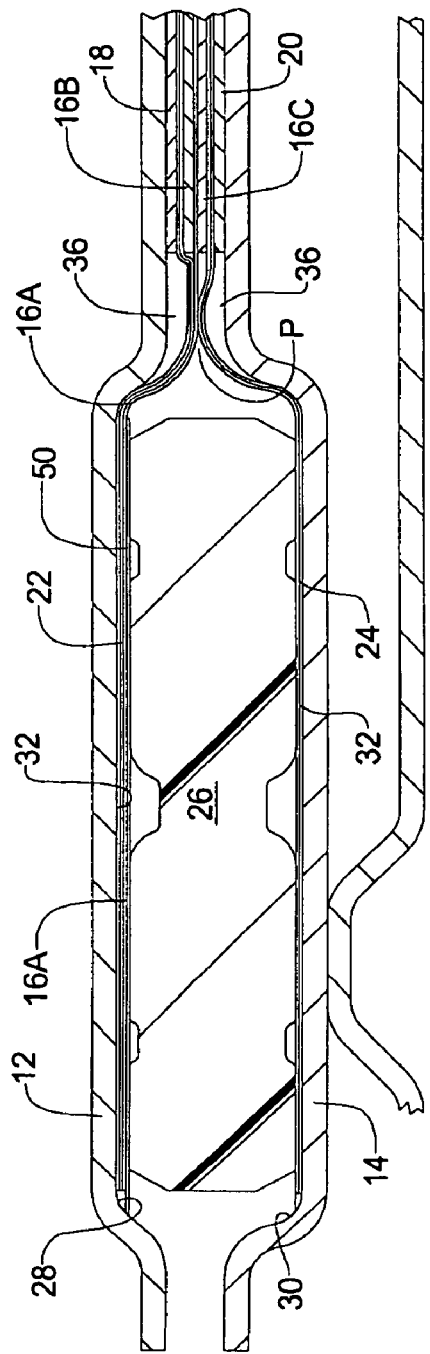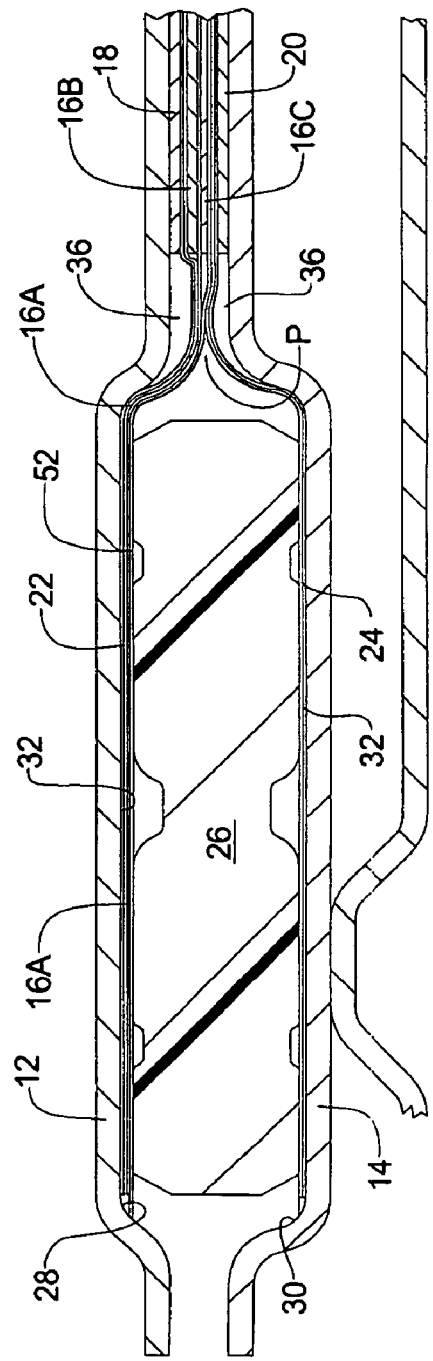

SEAL CONFIGURATION FOR FUEL CELL STACK

FIELD OF THE INVENTION

The present invention relates to PEM fuel cells, and more particularly, to a seal configuration incorporated within a fuel cell stack.

BACKGROUND AND SUMMARY OF THE INVENTION

Fuel cells have been used as a power source in many applications. For example, fuel cells have been proposed for use in electrical vehicular power plants to replace internal combustion engines. In proton exchange membrane (PEM) type fuel cells, hydrogen is supplied to the anode of the fuel cell and oxygen is supplied as the oxidant to the cathode. PEM fuel cells include a membrane electrode assembly (MEA) comprising a thin, proton transmissive, non-electrically conductive, solid polymer electrolyte membrane having the anode catalyst on one face and the cathode catalyst on the opposite face. The MEA is sandwiched between a pair of non-porous, electrically conductive elements or plates which serve as current collectors for the anode and cathode, and contain appropriate channels and/or openings formed therein for distributing the fuel cell's gaseous reactants over the surfaces of the respective anode and cathode catalysts.

The electrically conductive plates sandwiching the MEAs may contain an array of grooves in the faces thereof that define a reactant flow field for distributing the fuel cell's gaseous reactant's (i.e., hydrogen and oxygen in the form of air) over the surfaces of the respective cathode and anode. These reactant flow fields generally include a plurality of lands that define a plurality of flow channels therebetween through which the gaseous reactants flow from a supply header at one end of the flow channels to an exhaust header at the opposite end of the flow channels.

Typically, non-conductive gaskets or seals provide a seal and electrical insulation between the several plates of the fuel cell stack. In addition, the seals provide a flow path for the gaseous reactants from the supply header to the surfaces of the respective anode and cathode catalysts. Conventionally, the seals comprise a molded compliant material, such as rubber. Because the seals are made of compliant material and have a narrow wall thickness, handling them during the assembly process can be difficult.

FIG. 6 illustrates a prior art seal arrangement for a fuel cell stack including a first bipolar plate 110 and a second bipolar plate 112 each provided with a recessed groove portion 114, 116, respectively, around a perimeter thereof. An MEA 118 is disposed between the bipolar plates 110, 112. The MEA 118 includes an ionomer layer 118A including an anode catalyst on one face and a cathode catalyst on a second face. At the edges of the MEA 118, the ionomer layer 118A includes a first sub-gasket layer 122 and a second sub-gasket layer 124. The ionomer layer with two sub-gasket layers 122, 124 is disposed against one of the bipolar plates 110 in the recessed region 114. A seal member 126 is disposed in the recessed regions 114, 116 of the opposing bipolar plates 110, 112 and presses against the sub-gasket layer 124. The design of the prior art, as illustrated in FIG. 6, provides a relatively large bypass region 128 in which an anode or cathode gas may enter and is disposed against an edge surface of the seal member 126.

During assembly of a fuel cell stack, utilizing the seal configuration illustrated in FIG. 6, the components are visually positioned while the fuel cell stack is assembled with very limited controls over the positioning of the components. The relative humidity in the assembly area can change the size of the membrane 118 which, due to the sub-gaskets 122, 124 being connected to the membrane 118, requires that the humidity in the production area be controlled in order to reduce the sensitivity to ambient relative humidity variations. In other words, as the humidity dependent PEM membrane either expands or contracts under differing humidity conditions, the location of the gasket material relative to flow passages in the bipolar plates can be altered.

Accordingly, the present invention provides a seal configuration for a fuel cell including a first bipolar plate and a second bipolar plate each disposed on opposite sides of an MEA with each of the first and second bipolar plates including a recess region disposed along an edge thereof. The seal configuration includes a first sub-gasket adhered to the recess region of the first bipolar plate and a second sub-gasket adhered to the recess region of the second bipolar plate. The first and second sub-gaskets are disposed on opposite sides of the membrane electrode assembly. A seal member is disposed in the recess regions in the first and second bipolar plates and between the first and second sub-gaskets. The design of the present invention reduces the size of the bypass region, provides better control of the positions of all components, and eliminates failures due to incorrectly positioned parts. The approach further reduces sensitivity to ambient relative humidity variations and therefore reduces manufacturing costs by eliminating the need for humidity control in the production area.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a cross-sectional view of a seal configuration for a fuel cell according to the principles of the present invention;

FIG. 3 is a cross-sectional view of a seal configuration for a fuel cell according to a second embodiment of the present invention;

FIG. 4 is a cross-sectional view of a seal configuration for a fuel cell according to a third embodiment of the present invention;

FIG. 5 is a cross-sectional view of a seal configuration for a fuel cell according to a fourth embodiment of the present invention.

DETAILED DESCRIPTION OF THE PREFERRED EMBODIMENTS

The following description of the preferred embodiment(s) is merely exemplary in nature and is in no way intended to limit the invention, its application, or uses.

Figure 1:
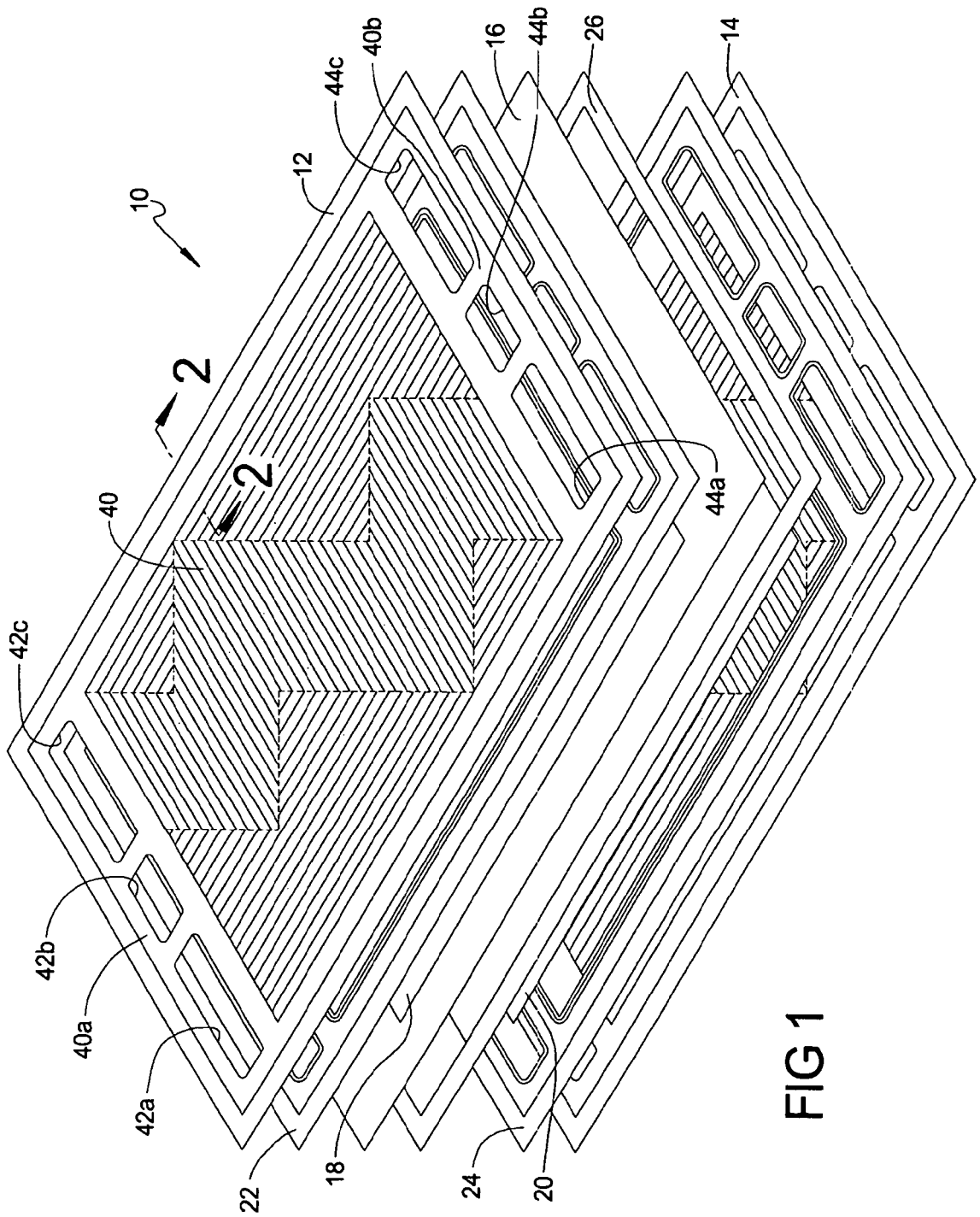
FIG. 1 is an exploded perspective view of a fuel cell according to the principles of the present invention.

With reference to FIGS. 1 and 2, the seal configuration for a fuel cell stack according to the principles of the present invention will now be described. As shown in FIG. 1, an exemplary fuel cell 10 includes a first bipolar plate 12 and a second bipolar plate 14 which are sandwiched with a membrane electrode assembly 16. A first diffusion media panel 18 is disposed between the first bipolar plate 12 and MEA 16, while a second diffusion media panel 20 is disposed between the second bipolar plate 14 and the MEA 16. A first sub-gasket 22 is disposed between the first bipolar plate 12 and MEA 16, while a second sub-gasket 24 extends between the second bipolar plate 14 and MEA 16.

As is known in the art, the bipolar plates 12, 14 each include a reactant gas flow field 40 characterized by a plurality of lands that define a plurality of flow channels through which the reactant gases flow from an inlet plate margin 40a of the stack to an exhaust plate margin 40b. The direction of flow across each anode and cathode plate is generally from the inlet plate margin 40a through respective flow fields to the outlet plate margin 40b. A plurality of supply header apertures 42a-42c are formed near the outer edge of the inlet plate margin 40a. Similarly, a plurality of exhaust header apertures 44a-44c are formed near the outer edge of the outlet plate margin 40b. More specifically, the supply header aperture 42a communicates fuel ($H_2$) over the anode plates and through the flow channels and out through exhaust header aperture 44a. Supply header aperture 42b communicates oxidant ($O_2$) over the cathode plates through the flow channels and out exhaust header aperture 44b. Finally, supply header aperture 42c communicates coolant between faces of the anode and cathode plate of the bi-polar plate, as needed, and coolant leaves the stack at exhaust header aperture 44c. It should be understood that the header locations can be varied with respect to the locations shown.

The diffusion media 18, 20, which are disposed against the flow channels of the bipolar plates 12, 14, help to distribute the reactant gases to the MEA 16, as is known in the art. A seal 26 is disposed in recessed regions 28, 30 (see FIG. 2) of bipolar plates 12, 14, respectively, which extend around a perimeter of the bipolar plates 12, 14.

Figure 6:
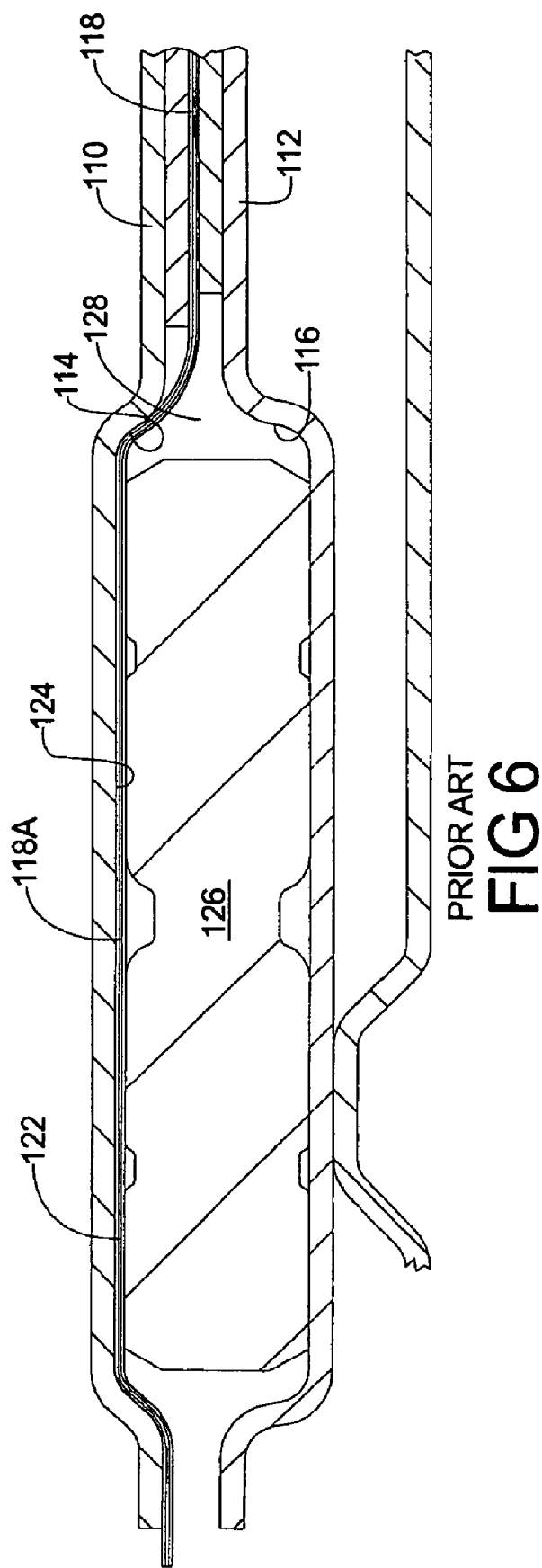
FIG. 6 is a cross-sectional view of a prior art seal configuration.

As illustrated in FIG. 2, the fuel cell 10 is shown in a stacked assembled condition in which the MEA 16 is disposed between the first bipolar plate 12 and second bipolar plate 14. The ionomer layer 16A of the MEA 16 extends between sub-gasket layers 22, 24 until the point P at which the sub-gasket layers 22, 24 divert toward the recessed regions 28, 30 of the bipolar plates 12, 14, respectively. The sub-gaskets 22, 24 are provided with a layer of adhesive 32 which adheres the sub-gaskets to the bipolar plates 12, 14. Alternatively, the adhesive 32 could be on the plate in the seal areas where the sub-gasket material would make contact with the adhesive during sub-gasket positioning. The sub-gaskets 22, 24 also overlay partially over the diffusion media layers 18, 20 and hold the diffusion media layers in place. The sub-gaskets 22, 24 can be made from known gasket materials. The seal 26 is disposed between the sub-gaskets 22, 24. The ribs of the elastomeric seal member 26 are compressed in order to provide a compression seal between the bipolar plates 12, 14. The diverging sub-gaskets 22, 24 provide reduced bypass regions 36 as compared with the large bypass region 128 of the prior art shown in FIG. 6. The bypass regions 36 are the regions which are exposed to the reactant gases (and reactant gas flow/bypass) in the sealed region between the bipolar plates.

According to a preferred embodiment of the present invention, the MEA 16 is provided with an ionomer layer 16A having an anode catalyst 16B on one face thereof and a cathode catalyst 16C on a second face thereof. The ionomer layer 16A extends along with sub-gasket 22 into the recessed region 28 of bipolar plate 12. In the embodiment of FIG. 2, the ionomer layer 16A continues to the outer edge of the plate 12 and is in contact with the seal member 26. According to a second embodiment as illustrated in FIG. 3, the ionomer layer ends at or near the point P where the two sub-gasket layers 22, 24 separate. With reference to FIG. 4, a third embodiment is shown in which the ionomer layer 16A continues to the outer edge of the plate 12 and a narrow ring 50 of additional sub-gasket between the ionomer layer 16A and seal member 26. The ring 50 extends inward and ends prior to point P where the sub-gasket layers 22, 24 separate. FIG. 5 illustrates a fourth embodiment in which a full layer of additional sub-gasket 52 is provided between the ionomer layer 16A and seal member 26. The sub-gasket 52 is adjacent to the sub-gasket layer 24 and separates therefrom at point P so that sub-gasket layers 24 and 52 are disposed on opposite sides of the seal member 26.

With the seal configuration of the present invention, as illustrated in FIGS. 1 and 2, the bypass regions are minimized while also providing better control of the positions of all the components which leads to the elimination of failures due to incorrectly positioned parts (positioning of the active area reactant window of the sub-gasket relative to the plate features). The present invention also reduces the sensitivity to ambient relative humidity variations that can affect the size and shape of the MEA 16 and, therefore, reduces manufacturing costs by eliminating the need for humidity control in the production area. With the system of the present invention, the sub-gasket components 22, 24 are attached to the bipolar plates 12, 14 as opposed to the MEA 16. By attaching the sub-gaskets 22, 24 to the bipolar plates 12, 14, the alignment of the header apertures in the sub-gasket is particularly controlled despite variations in size that the MEA 16 can encounter due to relative humidity of the ambient air in the production area.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A seal configuration for a fuel cell including a first bipolar plate and a second bipolar plate each disposed on opposite sides of a membrane electrode assembly, each of said first and second bipolar plates including a recess region disposed along an edge thereof, said seal configuration comprising:
   a first sub-gasket adhered to the recess region of the first bipolar plate;
   a second sub-gasket adhered to the recess region of the second bipolar plate, wherein said first and second sub-gaskets are disposed on opposite sides of the membrane electrode assembly;
   a seal member disposed in said recess regions in said first and second bipolar plates and between said first and second sub-gaskets; and
   a reduced bypass region adjacent said recess region of said first bipolar plate and said recess region of said second bipolar plate, wherein said first and second sub-gaskets come into contact at an end adjacent said membrane electrode assembly and diverge at an opposite end of said reduced bypass region and extend into said recess region of said first bipolar plate and said recess region of said second bipolar plate respectively, at least one of said first and second sub-gaskets being in direct contact with said seal member.

2. The seal configuration according to claim 1, further comprising a first diffusion media disposed between said first sub-gasket and said first bipolar plate and a second diffusion media disposed between said second sub-gasket and said second bipolar plate.

3. The seal configuration according to claim 1, wherein said first and second sub-gaskets overlap an edge portion of said membrane electrode assembly proximate to said reduced bypass region, said first sub-gasket disposed between and in direct contact with said first bipolar plate and said seal in said recess region of said first bipolar plate and said second sub-gasket disposed between and in direct contact with said second bipolar plate and said seal in said recess region of said second bipolar plate.

4. The seal configuration according to claim 1, wherein said membrane electrode assembly includes an ionomer layer that diverges from said second sub-gasket at said reduced bypass region and extends across said recess region in said first bipolar plate coaxially with said first sub-gasket, said ionomer layer being in direct contact with said seal member and said first sub-gasket.

5. The seal configuration according to claim 4, further comprising a third sub-gasket extending across said recess region in said first bipolar plate, wherein said third sub-gasket is disposed between and in direct contact with said ionomer layer and said seal member.

6. The seal configuration according to claim 5, wherein said third sub-gasket has an opening in a center portion thereof with an inner edge terminating at approximately an inner edge of said recess region of said first bipolar plate.

7. The seal configuration according to claim 5, wherein said third sub-gasket is disposed between said membrane electrode assembly and said second sub-gasket, said third sub-gasket diverging from said second sub-gasket at said reduced bypass region and extending into said recess region of said first bipolar plate coaxially with said ionomer layer and being in direct contact with said seal member.

8. A seal configuration for a fuel cell including a first bipolar plate and a second bipolar plate each disposed on opposite sides of a membrane electrode assembly, each of said first and second bipolar plates including a recess region disposed along an edge thereof, said seal configuration comprising:
a first sub-gasket adhered to the recess region of the first bipolar plate; a second sub-gasket adhered to the recess region of the second bipolar plate, wherein said first and second sub-gaskets are disposed on opposite sides of the membrane electrode assembly;
a seal member disposed in said recess regions in said first and second bipolar plates and between said first and second sub-gaskets;
a reduced bypass region adjacent said recess region of said first bipolar plate and said recess region of said second bipolar plate, wherein said first and second sub-gaskets come into contact at an end adjacent said membrane electrode assembly and diverge at an opposite end of said reduced bypass region and extend into said recess region of said first bipolar plate and said recess region of said second bipolar plate respectively, at least one of said first and second sub-gaskets being in direct contact with said seal member; and
a first diffusion media disposed between said first sub-gasket and said first bipolar plate and a second diffusion media disposed between said second sub-gasket and said second bipolar plate.

9. A seal configuration for a fuel cell including a first bipolar plate and a second bipolar plate each disposed on opposite sides of a membrane electrode assembly, each of said first and second bipolar plates including a recess region disposed along an edge thereof, said seal configuration comprising:
a first sub-gasket extending into the recess region of the first bipolar plate; a second sub-gasket extending into the recess region of the second bipolar plate, wherein said first and second sub-gaskets are disposed on opposite sides of the membrane electrode assembly;
a seal member disposed in said recess regions in said first and second bipolar plates and between said first and second sub-gaskets;
a reduced bypass region adjacent said recess region of said first bipolar plate and said recess region of said second bipolar plate, wherein said first and second sub-gaskets come into contact at an end adjacent said membrane electrode assembly and diverge at an opposite end of said reduced bypass region and extend into said recess region of said first bipolar plate and said recess region of said second bipolar plate respectively, at least one of said first and second sub-gaskets being in direct contact with said seal member;
wherein said membrane electrode assembly includes an ionomer layer diverging from said second sub-gasket at said reduced bypass region and extending across said recess region in said first bipolar plate coaxially with said first sub-gasket; and
a third sub-gasket disposed between and in direct contact with said ionomer layer and said seal member.

10. The seal configuration according to claim 9, wherein said third sub-gasket has an opening in a center portion thereof with an inner edge terminating at approximately an inner edge of said recess region of said first bipolar plate.

11. The seal configuration according to claim 9, wherein said third sub-gasket is disposed between said membrane electrode assembly and said second sub-gasket, said third sub-gasket diverging from said second sub-gasket at said reduced bypass region and extending into said recess region of said first bipolar plate coaxially with said ionomer layer and being in direct contact with said seal member.

12. A seal configuration for a fuel cell including a first bipolar plate and a second bipolar plate each disposed on opposite sides of a membrane electrode assembly, each of said first and second bipolar plates including a recess region disposed along an edge thereof, said seal configuration comprising:
a first region having a first sub-gasket disposed on a side of the membrane electrode assembly and a second sub-gasket disposed on a side of the membrane electrode assembly opposite said first sub-gasket;
a reduced bypass region wherein said first and second sub-gaskets come into contact at an end adjacent said membrane electrode assembly and diverge at an opposite end of said reduced bypass region; and
a second region encompassing said recess regions of said first and second bipolar plates, a seal member disposed in said recess regions in said first and second bipolar plates and between said first and second sub-gaskets, wherein said first sub-gasket is adhered to said recess region of said first bipolar plate and said second sub-gasket is adhered to said recess region of said second bipolar plate, wherein at least one of said first and second sub-gaskets is in direct contact with said seal member.

* * * * *